United States Patent [19]
Kosaka et al.

[11] Patent Number: 5,912,540
[45] Date of Patent: Jun. 15, 1999

[54] ROBOT CONTROL SYSTEM WHICH ENABLES SAFE ROBOT OPERATION AND SIMPLE RECOVERY WHEN UNDESIRED MOVEMENTS ARE DETECTED

[75] Inventors: Tetsuya Kosaka; Takeaki Aramaki, both of Oshino-mura, Japan

[73] Assignee: Fanuc, Ltd., Yamanashi, Japan

[21] Appl. No.: 08/765,400

[22] PCT Filed: May 9, 1996

[86] PCT No.: PCT/JP96/01227

§ 371 Date: Mar. 3, 1997

§ 102(e) Date: Mar. 3, 1997

[87] PCT Pub. No.: WO97/00760

PCT Pub. Date: Jan. 9, 1997

[30] Foreign Application Priority Data

May 9, 1995 [JP] Japan ................................. 7-110671

[51] Int. Cl.⁶ ............................................. B25J 9/22
[52] U.S. Cl. ........................ 318/568.14; 901/4; 901/49; 364/474.19
[58] Field of Search ................... 318/560, 563, 318/565, 568.11, 568.14, 568.18, 568.22, 568.24; 364/474.03, 474.19, 474.36; 901/3–5, 9, 16, 20, 23, 49

[56] References Cited

U.S. PATENT DOCUMENTS

| | | | |
|---|---|---|---|
| 3,752,098 | 8/1973 | Logan et al. | 112/470.07 |
| 4,170,751 | 10/1979 | Stricker | 318/563 |
| 4,494,060 | 1/1985 | Chitayat et al. | 318/568.14 |
| 4,774,445 | 9/1988 | Penkar | 318/568.18 |
| 4,947,336 | 8/1990 | Froyd | 364/474.3 |
| 5,081,593 | 1/1992 | Pollack | 395/88 |
| 5,301,103 | 4/1994 | Sakamoto et al. | 364/184 |
| 5,396,160 | 3/1995 | Chen | 318/573 |
| 5,434,489 | 7/1995 | Cheng et al. | 318/568.15 |

FOREIGN PATENT DOCUMENTS

| | | |
|---|---|---|
| 0 408 761 | 1/1991 | European Pat. Off. . |
| 50-29984 | 3/1975 | Japan . |
| 58-212871 | 12/1983 | Japan . |
| 59-161705 | 9/1984 | Japan . |
| 60-184107 | 12/1985 | Japan . |
| 2-76691 | 3/1990 | Japan . |
| 2-190292 | 7/1990 | Japan . |

*Primary Examiner*—Jonathan Wysocki
*Attorney, Agent, or Firm*—Staas & Halsey

[57] ABSTRACT

The robot control system of the present invention stores the robot's initial state data memory prior to engaging in an operation. During a manual movement operation, the robot is started at a predetermined low speed so that the operator may easily observe its movement and take corrective action thereby improving safety. While the robot is operating at this low speed a recovery command may then be issued by the operator from a recovery command unit when it is observed that the robot is moving inappropriately. Upon detection of the recovery command, a recovery control unit then operates causing the robot to recover its attitude and position as defined by the initial state data stored in memory. However, if a predetermined period of time elapses without a recovery command being issued, then speed of the robot is gradually increased from the predetermined low speed until reaching a predetermined target speed. Thereafter, the robot is manually controlled to operate at a constant speed.

10 Claims, 5 Drawing Sheets

5,912,540

ROBOT CONTROL SYSTEM WHICH ENABLES SAFE ROBOT OPERATION AND SIMPLE RECOVERY WHEN UNDESIRED MOVEMENTS ARE DETECTED

TECHNICAL FIELD

The present invention relates to a robot operation control system for machining or carrying workpieces, and more particularly to a robot operation control system in which an operational instruction is manually performed.

BACKGROUND ART

Conventionally, as a method of manually operating a robot, there are (1) an individual-axis manual feed for respective joint axes of a robot, (2) multi-directional manual linear feed in the perpendicular XYZ coordinate system defined in the working space of a robot, (3) manual linear feed in each axial direction in a perpendicular tool coordinate system defined for a wrist section of the distal end of a robot arm, and (4) manual feed for hand inclination control in the perpendicular coordinate system, and manual feed for the hand inclination control in the tool coordinate system. In practice, the required manual feed has to be carried out by first selecting one coordinate system for execution of these manual feed procedures and then selecting one axis being subject to such manual feed as well as its feed direction (+, −) Thus, it is necessary for the operator, before starting the operation of a robot, to check the exact direction of operation; based on the present attitude and coordinate system of the robot. This check is done depending on the operator's empirical perception. To do this, for example, the operator may first operate the robot to let it move a little to verify the resulting direction of movement, and then gives thereto a necessary operation command for the subsequent operation.

However, with such an operation control system, it may happen that the robot accidentally operates in directions operator did not expect. If this is the case, in the prior art, the operator is required to restart the operation by restoring the initial position and attitude of the robot manually. However, since the stored initial state information is lost when the robot is operated once, it has been difficult to restore the robot to its initial state accurately. This contributes to the complication of the work.

According to the prior known system, since the robot typically operates at a certain speed determined based on the override value set at the time of start, in those cases where this speed is greater than the operator's expected operation speed, there arises a risk of occurrence of work errors.

Furthermore, in the case of the prior art, when the preset overriding speed is too fast to verify the operating direction at the start of operation, it is required to check operating direction by once lowering the preset overriding speed, and thereafter restarting the intended work after returning the overriding speed to the set value. This adversely affects the working efficiency.

DISCLOSURE OF THE INVENTION

An object of the present invention is to provide a robot operation control system capable of assuring safety, upon initial activation of a robot in accordance with a manual operation command given by a jog button and the like, even if the robot should move in an unexpected direction, as well as enabling the robot to recover the proper direction of its operation.

To attain the foregoing object, in accordance with a first embodiment of the present invention, the robot is designed to be capable of recovering its stored initial position in response to a manual operation command by storing the initial state of the robot in advance. As a result, it becomes possible for the robot to surely restore its original position and attitude, while allowing the operating direction of the robot to be fine checked. This enables the robot to be moved by manual feed towards the target direction, thereby contributing to the improvement in working efficiency.

Also, in accordance with a second embodiment of the present invention, when the robot operation control is performed in response to the manual operation commands, during a certain time period from the start of operation, the robot is operated at a safety speed set in advance. Thus, safety can be maintained even if the robot should operate in a wrong direction unexpectable to the operator.

Figure 1:
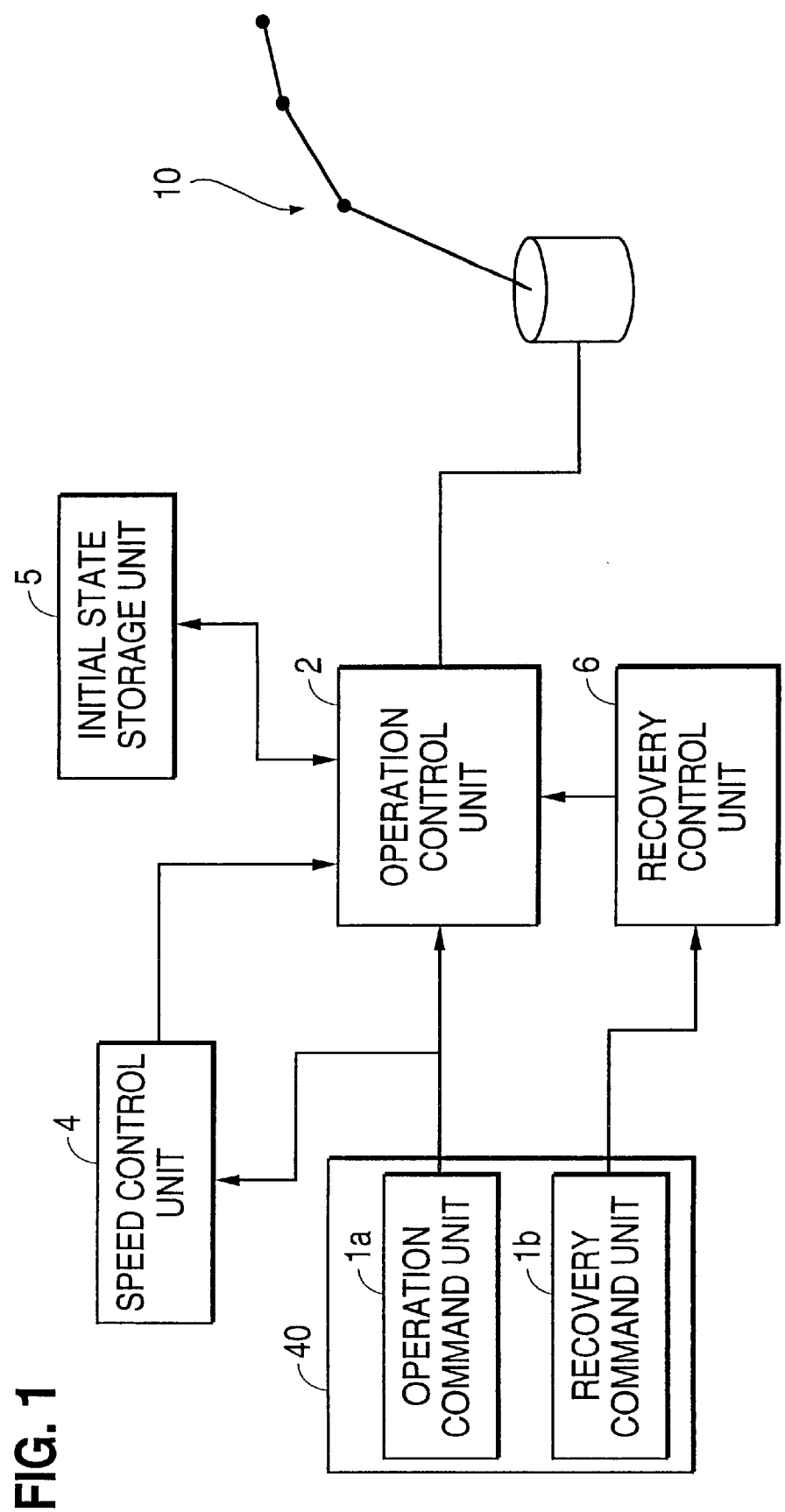
FIG. 1 is a block diagram showing several unit constituting a robot operation control system in accordance with a first embodiment of the present invention.
Figure 2:
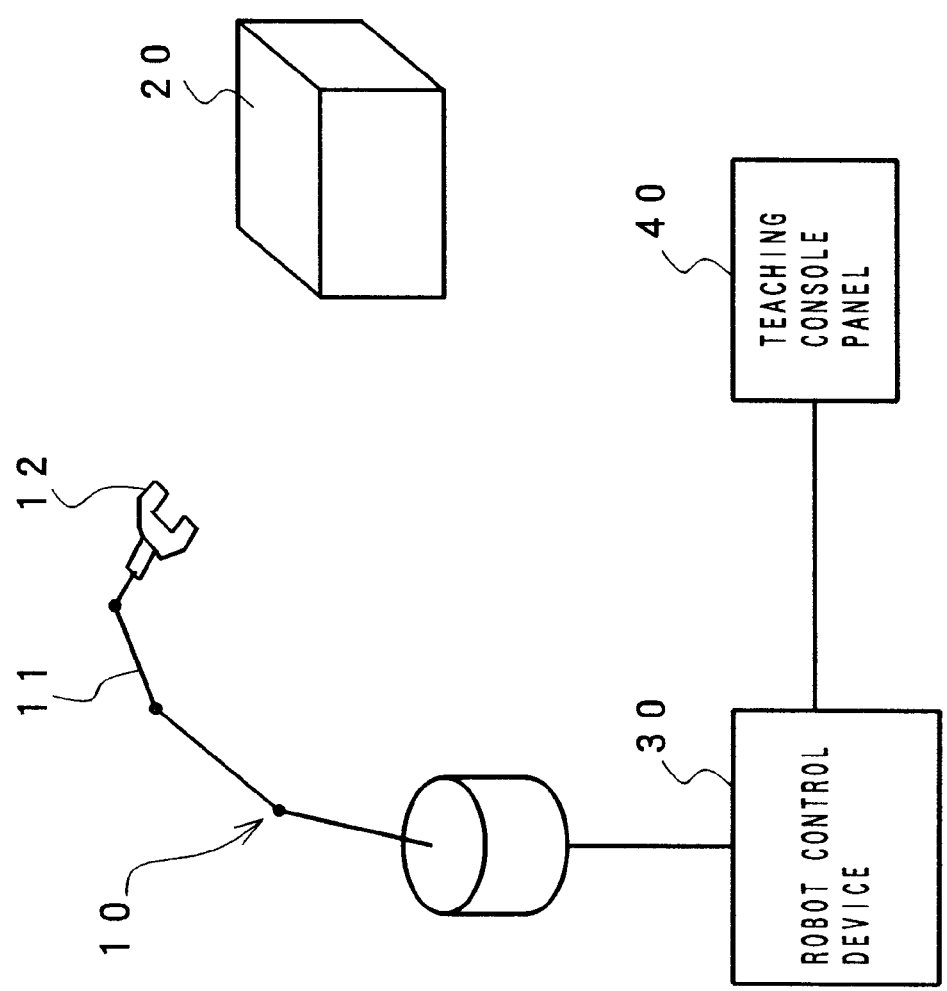
Figure 3:
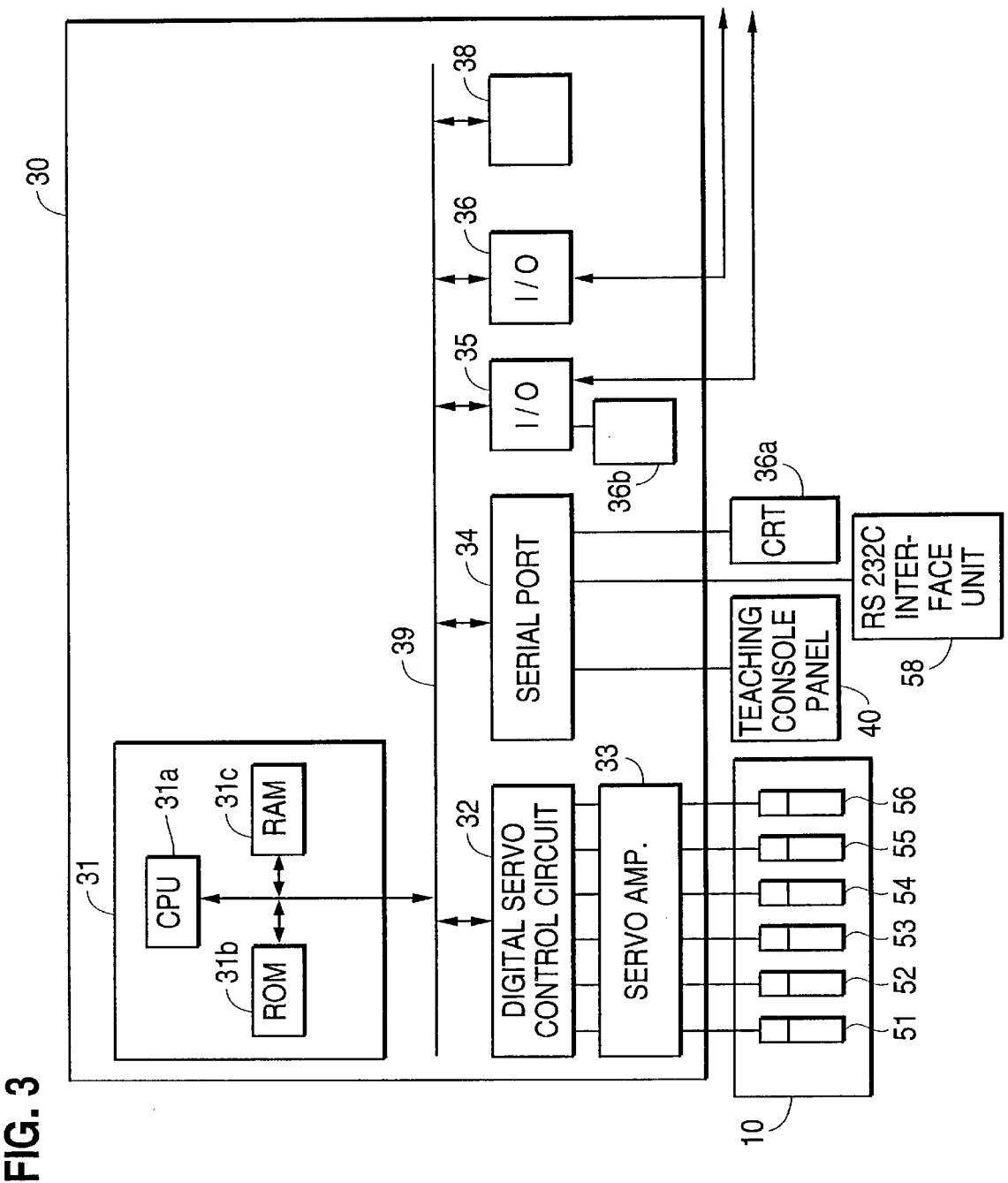
Figure 4:
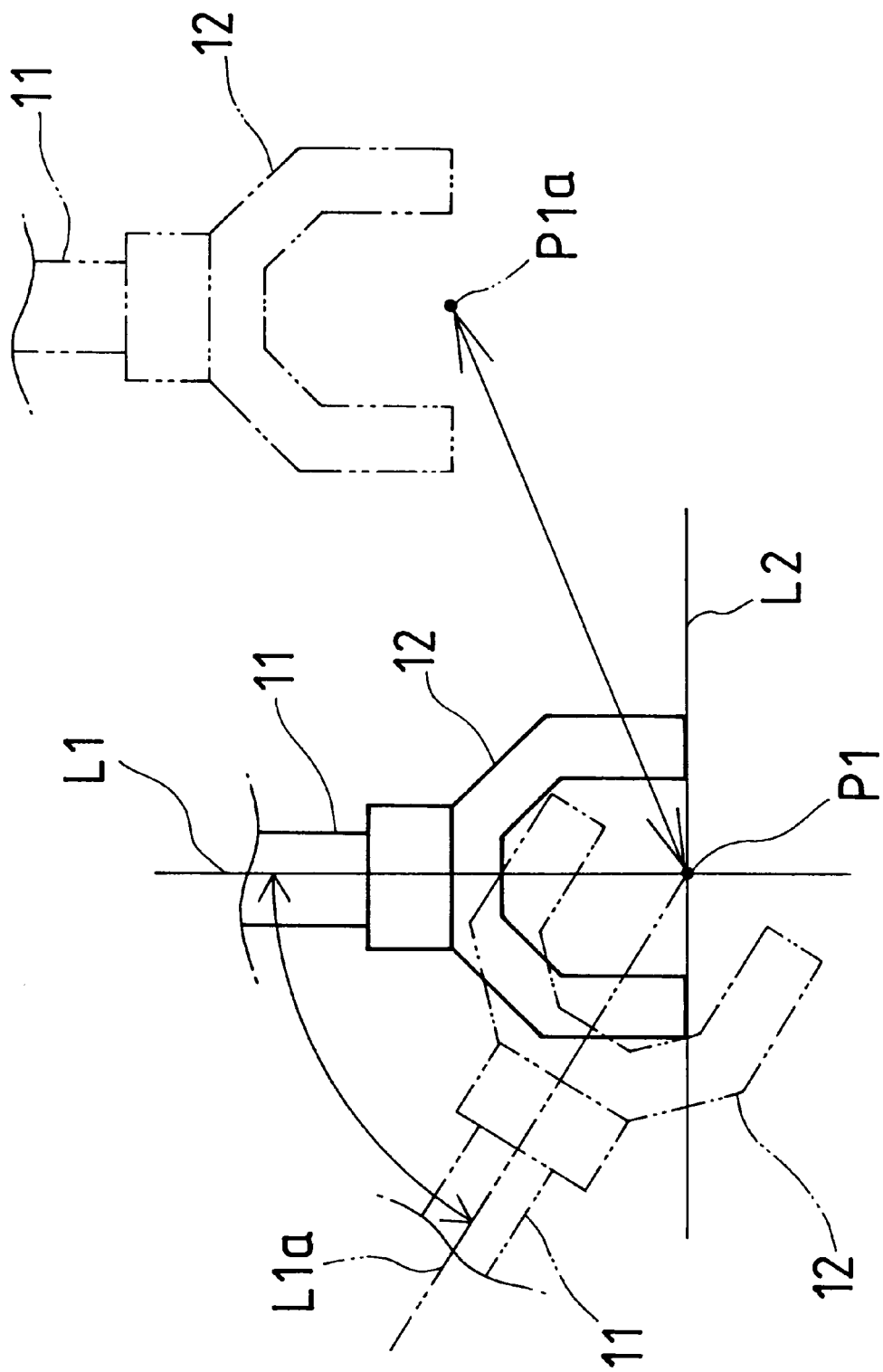

As FIG. 2 is a diagram showing an overall configuration of the robot operation control system of FIG. 1;

FIG. 3 is a block diagram showing a hardware configuration of a robot control device as included in the robot operation control system of FIG. 2;

FIG. 4 is a diagram explaining a robot in its initial state; and

Figure 5:
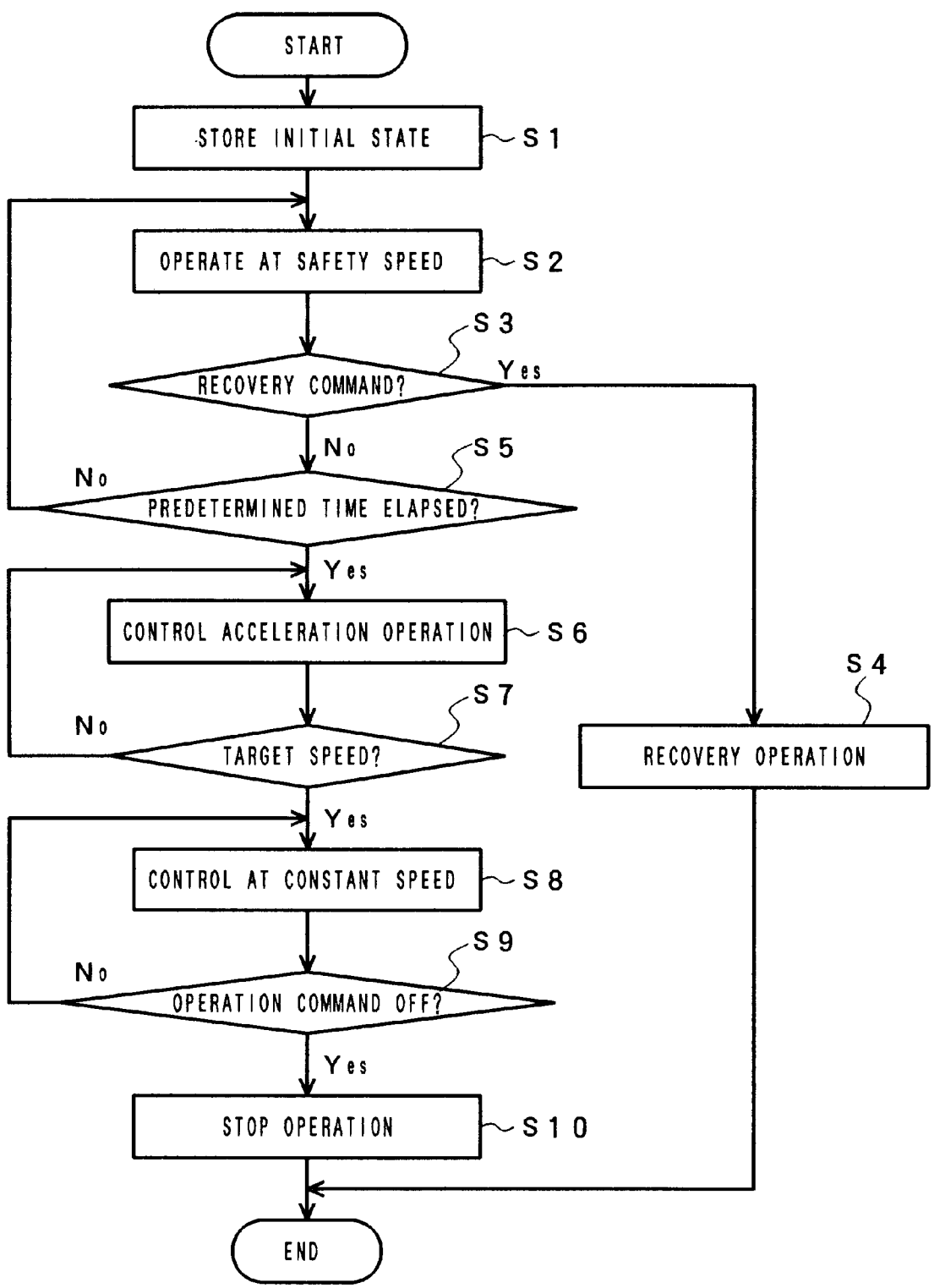

FIG. 5 is a flowchart showing a processing procedure of a processor for performing operation control of the robot.

BEST MODE FOR CARRYING OUT THE INVENTION

First, an explanation will be given of a summary of a first embodiment of the present invention referring to FIG. 1. A manual operation command of a robot 10 is executed by depressing a button (not shown) of a manual operation command unit 1a of a teaching console panel 40. In accordance with this manual operation command, an operation control unit 2 executes operation control of the robot 10. In this case, a speed control unit 4 controls operation of the robot 10 at a set low speed (safety speed) during a certain time starting from the start of operation until elapse of a predetermined length of time.

An initial state storage unit 5 is provided to store therein data indicative of the initial state of the robot 10. When the button (not shown) of a recovery command unit 1b of the teaching console panel 40 is activated to issue a recovery command, a recovery control means 6 operates to restore the robot 10 to its stored initial state.

The above operation control unit 2, speed control unit 4, initial state storage means 5 and recovery control unit 6 are all included in a robot operation control apparatus 30 of FIG. 2. Now, the overall configuration of the present embodiment will be explained with reference to FIG. 2.

A working tool 12 is attached to the distal end of an arm 11 of the robot 10. The operation of this robot 10 is controlled by the robot control apparatus 30 to machine a workpiece 20 or carry it. The robot 10 is commanded through the teaching console panel 40 which is connected to the robot control apparatus 30. This teaching console panel 40 is of a portable size so that the operator can carry it by hands, and comprises a liquid crystal display panel and several operating keys.

A hardware configuration of the robot control apparatus 30 will be explained with reference to FIG. 3. The robot control apparatus 30 is provided with a processor board 31; this processor board 30 includes a processor 31a, ROM 31b, and RAM 31c as mounted thereon. The processor 31a operates to control whole the robot control apparatus 30 in accordance with a system program as stored in the ROM 31b.

The RAM 31c stores several kinds of data items including an operation program of the robot 10, initial state data to be described later, target speed data, and predefined acceleration time data. Part of the RAM 31c is a nonvolatile memory, and the operation program, speed data, and predefined acceleration time data are stored in this nonvolatile memory section. This processor board is connected to a bus 39.

A digital servo control circuit 32 is connected to the bus 39 and is responsive to a command from the processor board 31 for driving servo motors 51, 52, 53, 54, 55 and 56 via a servo amplifier 33, These servo motors are built in the robot 10 for activating each of axes of the robot 10.

A serial port 34 is connected to the bus 39, and is also connected to the teaching console panel 40 with the display unit and others including an RS232C interface unit 58. The teaching console panel 40 has a size which allows an operator to carry it by hands as described previously, and its panel 40 has jog buttons, a recovery command button and the like (not shown) installed thereon. The serial port 34 is optionally connectable to a CRT 36a for enabling the operator to check the working condition, etc. by viewing the display screen on the CRT 36a from the location of the CRT 36a.

A digital I/O 35 is connected to an operation panel 36b for enabling an operator to issue an operation command 10 for the robot 10 at the position of the robot control apparatus 30. Also, data is received from and transmitted to other devices (not shown) by way of the digital I/O 35 and an analog I/O 37. A large-capacity memory 38 stores teaching data etc. These digital I/O 35, analog I/O 37 and large-capacity memory 38 are connected to the bus 39.

An explanation will now be given of a practical processing procedure of the robot operation control system of the present embodiment.

First, at a time point when the manual operation of the robot 10 gets started, the initial state data of robot 10 is stored in a specific area of the RAM 31c. This initial state data includes the data of position and inclination (attitude) of the tool 12.

In FIG. 4, solid lines represent the initial state of the robot 10. This illustration shows one example in which a hand unit with two fingers is employed as the tool 12 attached to the robot 10. In this case, for example, the reference point of the robot (tool 12) is determined by an intersection point P1 of a line L2 connecting between respective fingers and an axis L1 of the tool 12.

Upon start of operation the position of this reference point P1 is stored as the initial state data. Also, the inclination in a preset coordinate system of the axis L1 is stored as the initial state data.

When a manual operation command of the robot 10 is given by activating the jog buttons (not shown) on the teaching console panel 40, the arm 11 begins operating at a constant speed (safety speed) that has been determined in advance. While the jog button is kept depressed, this constant speed is maintained until a preset length of time elapses from the operation start time point; however, after elapse of such time duration, the arm is then controlled to accelerate with a preset time. Once it reaches the target speed to which an override is applied, the arm 11 will operate maintaining that speed thereafter. I instead of acceleration within a preset time (acceleration time) as explained before, as another acceleration method, acceleration of a predetermined value may be possible.

In the initial stage of such operation control for the robot 10, when the operating direction of the robot 10 (arm 11) differs from the operator's desired direction, the operator restore the robot 10 to its initial state by depressing a recovery command button (not shown) on the teaching console panel 40. More specifically, the reference point P1 of the tool 12 is made to return to its initial position from a movement point P1a representative of a present position. Also, regarding the attitude of axis L1, it is made to return from a present attitude of axis L1a to the initial attitude. In this way, after completing the procedure for restoring the initial state, it becomes possible to issue an operation command again.

The processing procedure of the processor 31a for executing operation control of the robot 10 as mentioned above will now be described in detail with reference to a flowchart of FIG. 5.

First, this operation gets started when the operator depresses the jog button of the teaching console panel 40.

Upon detecting of such activation of the jog button, the processor 31a operates to cause the RAM 31c serving as the initial state storage unit 5 to store therein the initial state data of the robot 10 (at step S1), as well as starting to control the robot 10 operating at the safety speed (step S2).

During the control of the robot 10 operating at safety-speed, the processor 31a determines whether or not the recovery command button of the teaching console panel 40 is depressed by the operator's manual operation (at step S3). If it is determined that the recovery command button is depressed, the robot 10 is then made to recover its initial state (step S4) to terminate this processing. On the other hand, when the recovery command button is not depressed yet, the processor determines whether or not a predetermined length of time has elapsed from the start of operation (step S5); if not, the routine goes back to the step S2 allowing the safety-speed operation to continue.

When the predetermined time has elapsed from the start of operation of the robot 10, the processor 31a, after confirming this fact, causes the present operating speed (safety speed) of robot 10 to increase gradually This means the execution of the process for transition to the acceleration operation. When it is verified that the speed of the accelerated robot 10 has reached the preset target speed (at step S7), the processor 31a controls the operation of the robot 10 at the preset target speed until the command is canceled by the jog button (step S8). Subsequently, when the command is canceled by the jog button, (step S9), the processor 31a, after verifying this fact, causes the robot 10 to terminate its operation (step S10).

As has been described above, with the present embodiment, since it is designed so that the initial state of the robot 10 is stored in advance to allow the robot to immediately restore to its initial state upon issuance of a recovery command even after the start of operation, it is possible for the robot 10 to recover its original position and attitude without fail. Hence, it is possible for an operator to finely verify the operation method of the robot 10, thereby enabling the operator to easily move the robot 10 to its target direction even by manual operation. As a consequence, the working efficiency can be much improved.

Furthermore, according to the present embodiment, since the robot 10 is designed to operate at the safety speed during a fixed time period from the start of operation, even when the robot 10 happens to operate in any directions other than those expected by the operator, safety can be secured.

Furthermore, according to this embodiment, since the speed is automatically switchable to the preset target speed after safety-speed operation for a predetermined length of time, any works can be carried out at desired speeds without requiring any manual changeover of speed as has been necessary in the prior art. This leads to a further improvement in working efficiency.

Still further, according to the present embodiment, any abrupt change in operation of the robot 10 can be prevented, since when changing from the safety speed to the target speed, the robot 10 is designed to accelerate taking, for example, a predetermined length of time.

Still further, according to the present embodiment, the hand section is employed as the tool 12, but any other types of tools may alternatively be employed therein.

We claim:

1. A robot operation control system in which robot operation is manually controlled, comprising:

initial state storage means for storing therein an initial state of operation of said robot, wherein said initial state comprises a position and attitude of a tool on said robot prior to any robot movement occurring;

operation command means for performing an operation command of said robot by a robot operator;

operation control means responsive to said operation commands for performing operation control of said robot;

recovery command means for commanding return to said initial state by the robot operator; and recovery control means for, when said recovery command is given, causing said robot to return to said stored initial state.

2. The robot operation control system as recited in claim 1, characterized in that said initial state of the tool is determined based on a position of a reference point of said robot in a predefined coordinate system.

3. The robot operation control system as recited in claim 1, characterized in that said initial state of the tool is determined based on a position and attitude of a reference point of said robot in a predefined coordinate system.

4. A robot operation control system in which robot operation is manually controlled, comprising:

operation command means for performing an operation command of said robot by a robot operator;

initial state storage means for storing an initial position and attitude of a tool on said robot when the operation command is given by the operator and prior to any robot movement occurring;

operation control means for performing operation control of said robot in accordance with said operation command;

speed control means for controlling said robot so as to operate at said predetermined safety speed until a predetermined length of time is elapsed from start of said operation, and recovery control means for returning the robot tool to the initial position and attitude when a recovery command is given by an operator and while the robot is operating at the predetermined safety speed.

5. The robot operation control system as recited in claim 4, characterized in that said speed control means is designed to cause, after elapse of said predetermined length of time, the operation speed of said robot to accelerate up to a target speed taking a preset time for acceleration.

6. The robot operation control system as recited in claim 4, characterized in that said speed control means is designed to cause, after elapse of said predetermined length of time, the operation speed of said robot to accelerate up to a target speed at a predefined rate of acceleration.

7. A robot operation control system in which robot operation is manually controlled, comprising:

initial state storage means for storing an initial state of operation of said robot, wherein said initial state comprises a position and attitude of a tool on said robot prior to any robot movement occurring;

operation command means for issuing an operation command of said robot by a robot operator;

operation control means responsive to said operation command for performing operation control of said robot;

recovery command means for commanding recovery to said initial state by a robot operator;

recovery control means for, when said recovery command is given, causing said robot to return to said stored initial state; and speed control means for controlling said robot to operate at said predetermined safety speed until a predetermined length of time is elapsed from start of said operation.

8. A robot operation control method comprising the steps of:

(a) storing an initial state data in a storage means before start of operation of a robot, wherein said initial state comprises a position and attitude of a tool on said robot prior to any robot movement occurring;

(b) causing the robot to start its operation at a predefined low speed by a robot operator;

(c) determining whether a recovery command is issued or not by the robot operator while the robot operates at the predefined low speed;

(d) causing, upon issuance of a recovery command by the robot operator, the robot to return to the attitude and position of the tool as defined by the initial state data stored in step (a), (e) causing, when the recovery command is absent until elapse of a predetermined length of time after start of the operation of said robot, the speed of robot to gradually increase from said low speed until a predefined target speed; and (f) thereafter permitting manual operation control of the robot at a constant speed.

9. The robot operation control method as recited in claim 8, characterized in that the operation speed of the robot in step (e) is gradually increased from said low speed up to said target speed taking predetermined length of time.

10. The robot operation control method as recited in claim 8, characterized in that the operation speed of the robot in step (e) is gradually increased from said low speed up to said target speed at a predetermined constant speed increase rate per unit time.

* * * * *